(12) United States Patent
Kim et al.

(10) Patent No.: US 9,027,429 B2
(45) Date of Patent: May 12, 2015

(54) ELECTRONIC SHIFT LEVER

(71) Applicant: Hyundai Motor Company, Seoul (KR)

(72) Inventors: Eun-Sik Kim, Gwangmyeong-si (KR); Jeong-Seop Lee, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/071,390

(22) Filed: Nov. 4, 2013

(65) Prior Publication Data

US 2014/0326096 A1    Nov. 6, 2014

(30) Foreign Application Priority Data

May 3, 2013   (KR) .................. 10-2013-0049799

(51) Int. Cl.
*B60K 17/04*    (2006.01)
*B60K 17/12*    (2006.01)
*F16H 59/10*    (2006.01)
*F16H 59/08*    (2006.01)

(52) U.S. Cl.
CPC .............. *F16H 59/105* (2013.01); *F16H 59/08* (2013.01)

(58) Field of Classification Search
CPC ..... F16H 59/105; F16H 59/044; F16H 59/02; F16H 59/04; F16H 59/08
USPC ........................................... 74/473.1, 473.12
See application file for complete search history.

(56) References Cited

U.S. PATENT DOCUMENTS

| 6,155,128 A * | 12/2000 | Ersoy et al. ................. 74/473.12 |
| 6,382,045 B1 * | 5/2002 | Wheeler ..................... 74/473.12 |
| 6,931,961 B2 * | 8/2005 | Bauer et al. ................. 74/473.12 |
| 7,334,496 B2 * | 2/2008 | Ersoy ......................... 74/473.12 |
| 7,552,659 B2 * | 6/2009 | Komatsu et al. ................ 74/335 |
| 7,640,823 B2 * | 1/2010 | Bowman et al. ............ 74/473.33 |
| 2012/0144949 A1 * | 6/2012 | Kim et al. .................. 74/473.33 |

FOREIGN PATENT DOCUMENTS

| JP | 2008-032155 A | 2/2008 |
| KR | 10-2006-0008071 A | 1/2006 |
| KR | 10-2013-0013960 A | 2/2013 |

* cited by examiner

*Primary Examiner* — Justin Krause
(74) *Attorney, Agent, or Firm* — McDermott Will & Emery LLP

(57) ABSTRACT

An electronic shift lever includes a case through which a hollow is formed in a longitudinal direction. A shift lever cover covers the hollow and is connected to the case. A rod housing is located adjacent the bottom of the case where a through-pipe is disposed in a longitudinal direction. A rod is disposed in the through-pipe and slides frontward and rearward. A recognition sensor is disposed in a longitudinal direction at an inner lower side of the rod housing. Shift stage magnets are arranged in a longitudinal direction spaced apart from a lower side of the shift lever cover and are able to stop the rod temporarily.

7 Claims, 4 Drawing Sheets

ELECTRONIC SHIFT LEVER

CROSS-REFERENCE TO RELATED APPLICATION

This application claims under 35 U.S.C. §119 priority to and the benefit of Korean Patent Application No. 10-2013-0049799, filed on May 3, 2013, in the Korean Intellectual Property Office, the disclosure of which is incorporated herein by reference in its entirety.

TECHNICAL FIELD

The present disclosure relates to an electronic shift lever, and more particularly, to an electronic shift lever for a vehicle that is wrinkle shaped using flexible material on a shift lever cover.

BACKGROUND

Generally, a transmission is a device for transferring engine power to driving wheels by converting engine power into appropriate rotational force and velocity for a driving state of a vehicle. The transmission can be either a manual transmission or an automatic transmission. A shift lever is operated by a driver to select shift stages in the manual transmission or the automatic transmission.

With respect to the manual transmission, engine power is transferred to the transmission through a cable or a rod when a driver selects a proper gear by shifting a lever. In the automatic transmission, the shift lever drives an inhibitor switch through a cable such that a movement made by the driver is transferred to the transmission.

Recently, an electronic shift lever has been widely used instead of a mechanical shift lever. In an electronic shift lever, shifting is controlled electronically using an actuator to operate mechanical coupling between a transmission, a shift lever, and an engine control unit (ECU).

The electronic shift lever has advantages that, cable-coupling structures are not necessary, operation force and operation feeling of the shift lever are excellent, and the operation thereof is simple. However, the conventional electronic shift lever has disadvantages similar to those of the mechanical shift lever. As shown in FIG. 1, the conventional electronic shift lever, like the mechanical shift lever, protrudes from the console of a vehicle in order to be operated using a front/rearward motion. That is, since the electronic shift lever protrudes over a console of a vehicle, a head of a driver may be injured when a vehicle accident occurs, and the appearance of the interior of the vehicle is not aesthetically pleasing. Additionally, the conventional electronic shift lever occupies significant space, and thus space for a cup holder or function buttons is limited.

In the conventional electronic shift lever, the shift stage is displayed on a shift lever handle with small size so that a driver may have difficulty in recognizing the characters displayed on the handle.

The description provided above of the related art of the present disclosure is just for enhancement of understanding the background of the present disclosure, and therefore, should not be construed as being included in the related art known by those skilled in the art.

SUMMARY

The present disclosure has been made in an effort to solve the above-described problems associated with the related art.

The present disclosure provides an electronic shift lever, which does not protrude over the automobile console thereby reducing the risk of driver injury when a vehicle collides, and providing an enough space for a driver to easily recognize a displayed shift stage.

An electronic shift lever according to the present invention includes a case in which a hollow is formed in a longitudinal direction, and a shift lever cover disposed to cover the hollow and connected to the lower sides of a front and a rear case by a case connector. A rod housing is located adjacent the bottom of the case in which a through-pipe is disposed in a longitudinal direction. A rod is disposed in the through-pipe and sides frontward and rearward at a predetermined distance from a lower side of the shift lever cover. A recognition sensor is disposed in a longitudinal direction at an inner lower side of the rod housing and senses the location of the rod. Shift stage magnets are arranged in a longitudinal direction at a predetermined distance from a lower end side of the shift lever cover. The shift stage magnets are able to stop the rod temporarily.

A shift stage operator that protrudes upward to bend the shift lever cover is disposed at one remote end of the rod, and a rod magnet that responds to the recognition sensor is disposed at another remote end of the rod.

The shift lever cover is made of a selected from the group consisting of fabric, cloth, wood, vinyl, leather, and aluminum. The shift lever cover has elasticity and flexibility such that a part of the shift lever cover is curved upward in accordance with the movement of the shift stage operator, and remaining part of the shift lever cover corresponding to the rod is maintained in a flat shape.

The rod housing further includes a plurality of rod holes spaced apart from each other formed at a lower side of the through-pipe.

The electronic shift lever further includes an operation feeling portion that is located between the shift lever cover and the rod in the same size as the shift lever cover, and a plurality of fixation pendulum for connecting the shift lever cover and the operation feeling portion between the shift lever cover and the operation feeling portion.

The shift stage magnets are composed of a P-stage magnet, an R-stage magnet, an N-stage magnet, a D-stage magnet, a +(positive)-stage magnet, an M-stage magnet, and the −(negative)-stage magnet 57 that are separated from each other, wherein the P-stage magnet, the R-stage magnet, the N-stage magnet, and the D-stage magnet are spaced apart at an identical distance. The space between the D-stage magnet and the +(positive)-stage magnet is longer than each spaces between the P-stage magnet and the R-stage magnet, the N-stage magnet and the D-stage magnet wherein the +(positive)-stage magnet and the −(negative)-stage magnet are smaller in size than the size of the M-stage magnet thereby having a magnetic force weaker than that of the M-stage magnet.

The shift stage magnet is composed of one magnet and includes a magnet cover formed in a longitudinal direction adjacent a top surface of the shift magnet, in which a plurality of holes are spaced apart from each other in a longitudinal direction.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure.

Figure 1:
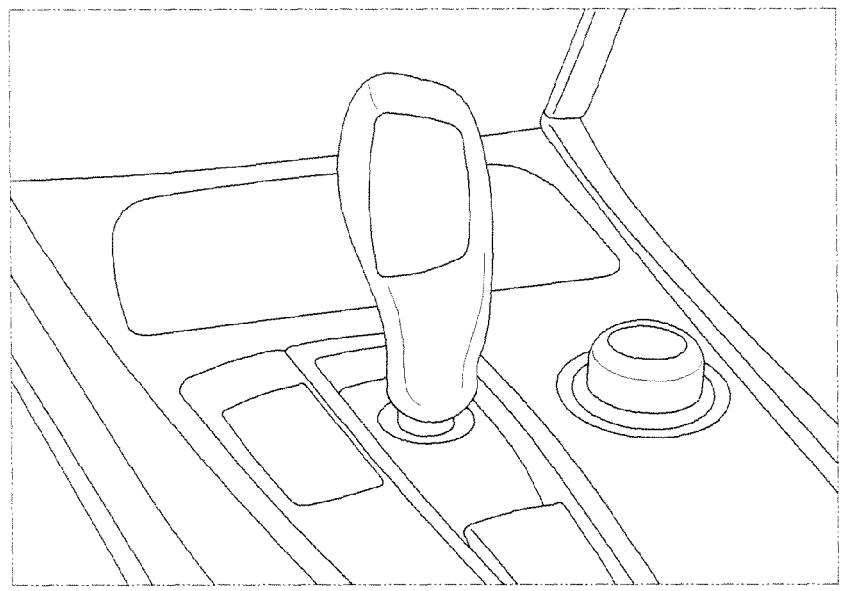
FIG. 1 is a perspective view showing a conventional electronic shift lever.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, preferred examples of the present disclosure now will be described in detail with reference to the accompanying drawings.

An electronic shift lever according to an embodiment of the present disclosure includes a case 10 in which a hollow 11 is formed in a longitudinal direction and a shift lever cover 20 formed to cover the hollow 11 and coupled to lower sides of a front and rear of the case 10 by a case connector 21. A rod housing 33 is located adjacent the lower end of the case 10, in which a through-pipe 35 is disposed in a longitudinal direction. A rod 30 is disposed in the through-pipe 35 and slides frontward and rearward spaced apart from the lower side of the shift lever cover 20. A recognition sensor 40 is disposed in a lower side of the rod housing 33 in a longitudinal direction and senses the location of the rod 30. Shift stage magnets 50 are arranged in a longitudinal direction being spaced apart from a lower end of the shift lever cover 20. The shift state magnets are able to stop the rod 30 temporarily.

Figure 2:
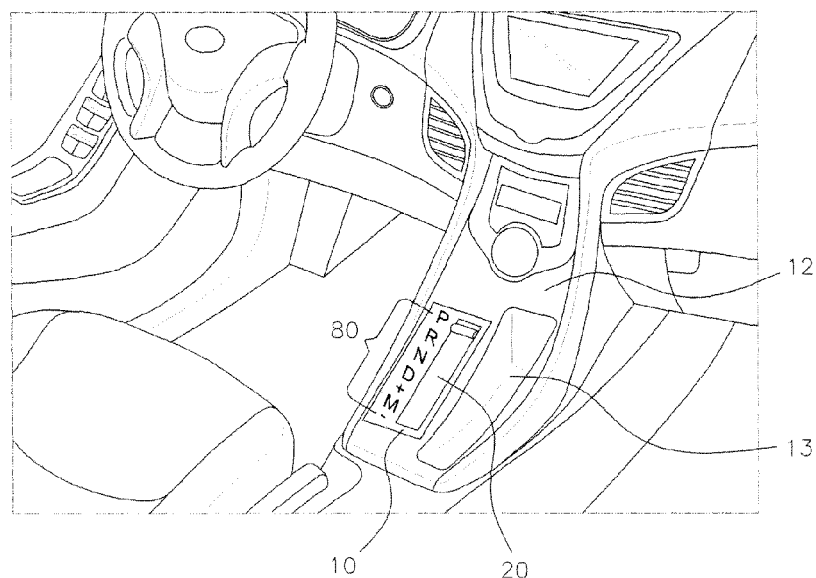
FIG. 2 is a perspective view showing an electronic shift lever according to the present disclosure, which is arranged in a vehicle.
Figure 3:
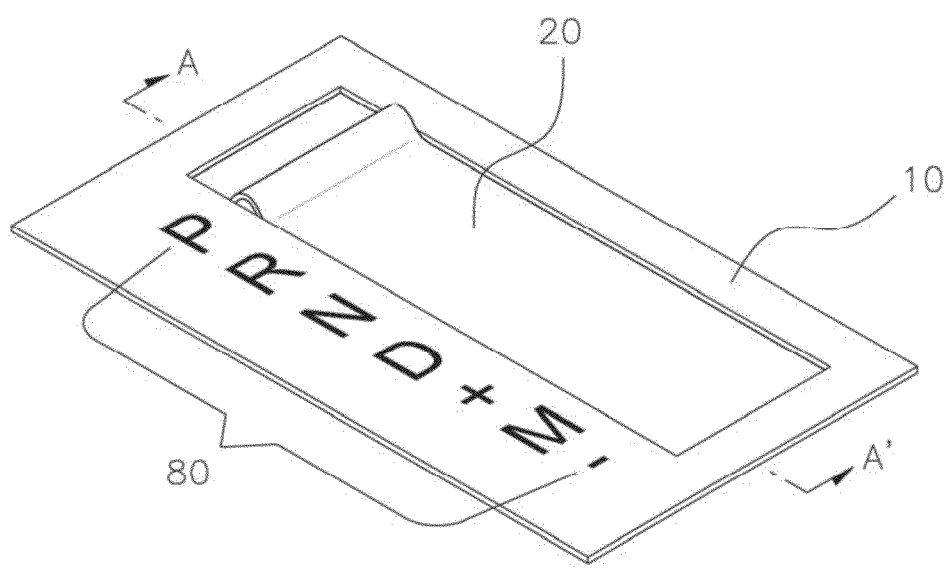
FIG. 3 is a perspective view showing the electronic shift lever according to the present disclosure.
Figure 4:
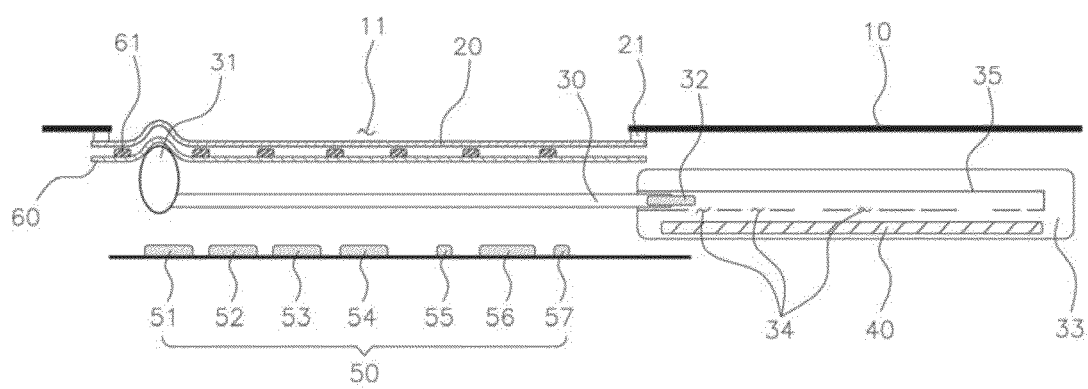
FIG. 4 is a sectional view taken along A-A' of FIG. 3.

Referring to FIGS. 2 to 4, the case 10 is attached to a console 12 of a vehicle where a conventional electronic shift lever is disposed, and the hollow 11 is formed in a longitudinal direction inside the case.

Unlike the conventional electronic shift lever that protrudes over the console of a vehicle, the case 10 is formed with a surface corresponding to the console 12 wherein an accommodating space or function buttons may be arranged adjacent the right side of the case 10.

The case 10 may be formed in various shapes such as a rectangular shape or an ellipse and may be formed of the same material as the console 12 to have an aesthetic sense of unification through the entire interior of the vehicle.

With the case 10, injury to a driver which may be caused from an impact with the conventional protruding electronic shift lever when a vehicle collides can be prevented, and the case 10 may occupy smaller space than the conventional electronic shift lever, thereby permitting more space around the case 10, and accommodating space 13 for function buttons that may be arranged having fewer limitations.

As shown in FIG. 4, the shift lever cover 20 connects the front and the rear of the hollow 11 to cover the hollow 11, and is attached to a lower side of the case 10.

The shift lever cover 20 may be made of using various materials such as fabric, cloth, wood, vinyl, leather, or aluminum plate to improve an operation feeling. The shift lever cover maybe have elasticity and flexibility such that a portion contacting the shift stage operator 31 may be curved upwardly according to the movement of the shift stage operator 31, and the remaining portion of the shift lever cover 20 may be flat-shaped to exhibit an elegant design for the entire interior of a vehicle.

Figure 5:
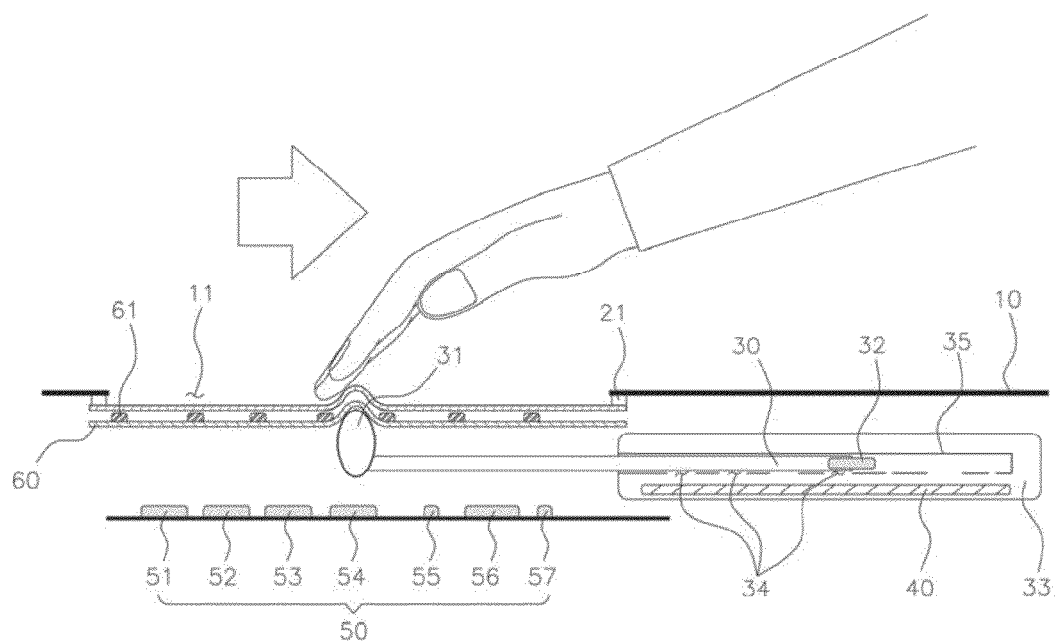
FIG. 5 is a sectional view showing the electronic shift lever being operated according to the present disclosure.

Referring to FIG. 5, the shift lever cover 20 may be made of elastic and flexible material such that the portion contacting the shift stage operator 31 protruding upwardly for a driver to operate the shift stage, is curved upward, and the remaining portion of the shift lever cover 20 is maintained in a flat shape.

The fabric refers to an article weaved by hanging woof and warp on a loom and includes cotton textiles, woolen textiles, silk products, etc. and especially, the fabric used on the shift lever cover 20 may be made of high quality velvet material to improve operation feeling of a driver.

Cloth and the vinyl also minimize deformation of the shift lever cover 20 due to functions of impact absorption, waterproofing, etc. A special cloth or special vinyl with excellent tactile properties may be used.

The wood and the aluminum plate may be made of thin material so as to bend the shift lever cover 20 upward.

The shift lever cover 20 is for the electronic shift lever, which an operator is directly in contact with, therefore, tactile sensation and aesthetic appearance are important. The shift lever cover 20 may be made of various flexible materials to improve tactile sensation of the driver, unlike the conventional electronic shift lever composed of hard plastic material.

The shift lever cover 20 may be coupled to the case 10 with the case connector 21 to maintain tensile strength within the shift lever cover 20, and accordingly, the shift lever cover 20 may not droop downward.

The shift lever cover 20 may have slightly greater size than the hollow 11 such that it may be bent upwardly by the shift stage operator 31 disposed at one end of the rod 30.

As shown in FIG. 4, the rod housing 33 is located spaced part from the bottom of the case 10, and the through-pipe 35 is disposed therein in a longitudinal direction to accommodate the rod 30.

The rod 30 accommodated in the through-pipe 35 moves frontward and rearward along the through-pipe 35, and the recognition sensor 40 responds thereto by recognizing magnetic force of a rod magnet 32 formed at the end of the rod 30.

Additionally, a plurality of rod holes 34, which are spaced apart from each other with the same pattern as the shift stage magnets 50, are disposed separately on a bottom of the through-pipe 35, such that the recognition sensor 40 recognizes the magnetic force of the rod magnet 32 when the rod magnet 32 at one end of the rod 30 is located over the rod hole 34.

That is, the through-pipe 35 and the rod housing portion 33 may be configured such that the rod 30 responds to the recognition sensor 40 through the rod magnet 32 disposed at an end of the rod 30 regardless of the existence of the rod holes 34.

The rod 30 is disposed along the through-pipe 35 in a longitudinal direction so as to be accommodated in the through-pipe 35, and moves frontward and rearward with a predetermined distance from the lower side of the shift lever cover 20.

The rod 30 may be composed of plastic material, and the shift stage operator 31 protruding toward the direction of the shift lever cover 20 is disposed at one end of the rod 30 so as to bend the shift lever cover 20 upward, and the rod magnet 32 is formed at the other end of the rod 30.

As shown in FIG. 5, a driver can operate the shift stage of a vehicle by operating the part of the shift lever cover 20 curved upward by the shift stage operator 31.

The shift stage operator 31 may be composed of metal substance such as iron or copper or be made of a magnet having a polarity different from the shift stage magnet 50 to generate magnetic force in relation to the shift stage magnets 50.

Additionally, the upper part of the shift stage operator 31 may be formed in a round shape like an egg or a dome so that a driver can operate the electronic shift lever easily and comfortably.

The rod magnet 32 disposed in the other end of the rod 30 is made of magnet having a magnetic force to determine the location of the shift stage of a vehicle by the recognition sensor 40 when the rod 30 moves.

That is, when the shift stage operator 31 stops temporarily to be located over the shift stage magnets 50 by magnetic force, the recognition sensor 40 recognizes the location of the shift stage from the rod magnet 32 formed at the other end of the rod 30 and transfers the movement made by a driver to a transmission.

As shown in FIG. 4, the shift stage magnets 50 are arranged in a longitudinal direction at a bottom of the rod 30 being spaced apart therefrom at a predetermined distance and serves as a temporary stopper for the rod 30.

The shift stage magnets 50 are composed of a P-stage magnet 51, an R-stage magnet 52, an N-stage magnet 53, a D-stage magnet 54, a +(positive)-stage magnet 55, an M-stage magnet 56, and a −(negative)-stage magnet 57 wherein each magnet may be spaced apart from each other.

The locations of the magnets determine the locations of the shift stages, respectively, and the space between the D-stage magnet 54 and the +(positive)-stage magnet 55 may be greater than the distance between other magnets, thereby a sports mode operation section composed of the +(positive)-stage magnet 55, the M-stage magnet 56, and the −(negative)-stage magnet 57 may be entirely separated from other shift sections.

The shift stage operator 31 is able to return directly to the direction of M-stage magnet 56 without being deflected toward the D-stage magnet 54 by the magnetic force of M-stage magnet 56 more intensively than the D-stage magnet 54 when the shift stage operator 31 is located above the +(positive)-stage magnet 55 or the −(negative)-stage magnet 57.

The +(positive)-stage magnet 55 and the −(negative)-stage magnet 57 are formed in relatively smaller size than the M-stage magnet 56 and use magnets with relatively weaker magnetic force than the M-stage magnet 56. Therefore, when a driver operates the shift stage operator in the direction of the +(positive)-stage magnet 55 or the −(negative)-stage magnet 57, the shift stage operator 31 returns to M-stage and stops even though the driver feels a sense in a disciplined and soldierly manner by the +(positive)-stage magnet 55 or the −(negative)-stage magnet 57.

In order to operate the sports mode, a driver locates the shift stage operator 31 above the M-stage magnet 56 and moves the shift stage operator to the +(positive)-stage magnet 55 or the −(negative)-stage magnet 57 to change the shift stage of a vehicle, wherein the shift stage operator 31 located above the +(positive)-stage magnet 55 or the −(negative)-stage magnet 57 returns above the M-stage magnet 56 by magnetic force of the M-stage magnet 56.

Figure 6:
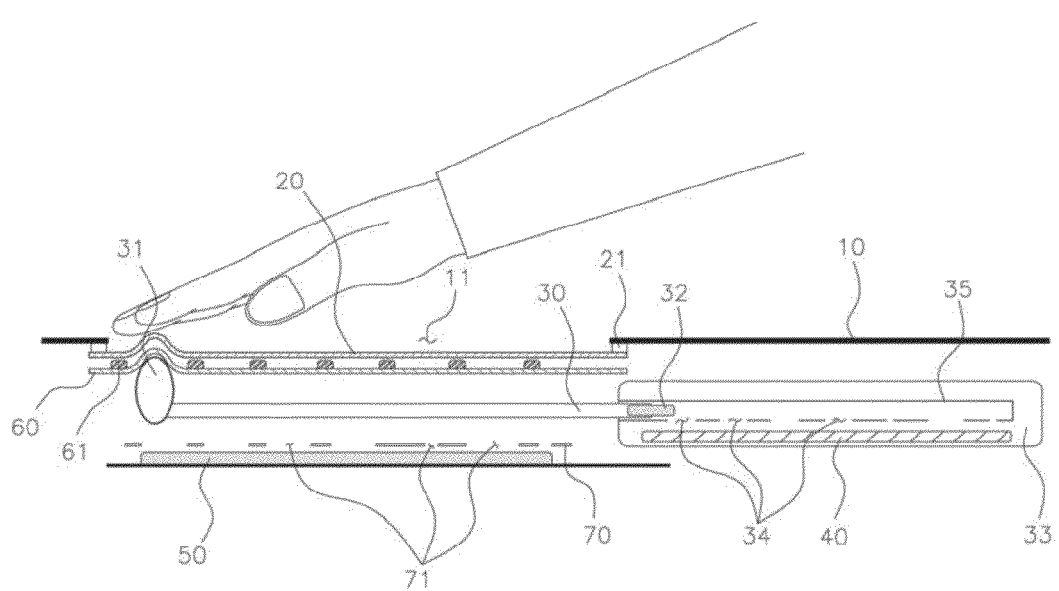
FIG. 6 is a sectional view showing a magnet cover and a magnet of a shift stage according to the present disclosure.

Referring to FIG. 6, the shift stage magnets 50 may be composed of one magnet, and a magnet cover 70 having holes 71 that are spaced apart each other therein in a longitudinal direction is disposed adjacent the top of the shift stage magnets 50.

The holes 71 of the magnet cover 70 may be arranged in the same patterns as those of the P-stage magnet 51, the R-stage magnet 52, the N-stage magnet 53, the D-stage magnet 54, the +(positive)-stage magnet 55, the M-stage magnet 56, and the −(negative)-stage magnet 57.

When a driver moves the shift stage operator 31 to be located above the holes 71, like a case where the shift stage magnets 50 are formed to be spaced from each other, the rod 30 stops temporarily by the magnetic force in relation to the shift stage magnets 50. At this time, the recognition sensor 40 determines the state of the current shift stage by responding to the magnetic force of the rod magnet 32.

Additionally, as shown in FIG. 4, an operation feeling portion 60 connecting the front and the rear of the shift lever cover 20 may be located between the shift lever cover 20 and the rod 30.

The operation feeling portion 60 may be made of polytetrafluoroethylene material, etc. and assists the rod 30 to move smoothly within the electronic shift lever.

Like the shift lever cover 20, the operation feeling portion 60 may have slightly greater size than the hollow 11 so as to be bent upward by the shift stage operator 31, and have the same size as the shift lever cover 20.

A plurality of fixation pendulums 61, that are spaced apart from each other and connect the shift lever cover 20 and the operation feeling portion 60, may be formed between the shift lever cover 20 and the operation feeling portion 60.

The fixation pendulum 61 is made of metallic or plastic material having sufficient weight such that the entire shift lever cover 20 is not to be bent upward but only the part where the shift stage magnets 50 are disposed is to be bent upward.

The fixation pendulum 61 may be spaced at various distances in accordance with the application types of the electronic shift lever corresponding to the types of the shift stage magnets 50.

Referring to FIG. 4, when the shift stage magnet 50 is formed with a plurality of magnets spaced apart from each other, the fixation pendulum 61 is arranged so as to correspond to the space between the separated shift stage magnets 50. Referring to FIG. 6, when the shift stage magnet is composed of one magnet, and the magnet cover 70 having the holes 71 is disposed on an upper side of the shift stage magnet 50, the fixation pendulum 61 is arranged so as to correspond to the space between the holes 71.

Referring to FIG. 3, the electronic shift lever may further include a shift stage display 80 arranged in a direction of the shift lever cover 20 at the upper side of the case 10 so as to display the current shift stage in accordance with the operation of the shift lever.

When the shift stage operator 31 is located above the P-stage magnet 51 of the shift stage magnet 50, the position of the current shift stage is determined by the recognition sensor 40, and a P-stage window of the shift stage display 80 is illuminated so that a driver can recognize the state of the current shift stage at a glance.

The operation of the electronic shift lever according to a certain embodiment of the present disclosure will be described hereinafter.

As shown in FIG. 5, when a driver moves the shift stage operator 31 that bends the shift lever cover 20 upward, the shift stage operator 31 is stopped temporarily by the magnetic force of the shift stage magnet 50.

At this time, the fixation pendulum 61 is located on both sides of the shift stage operator 31 so that the shift lever cover 20 is not entirely bent but only the portion where the shift stage operator 31 is located, is bent upward with precision.

When the shift stage operator 31 is repositioned by a driver, the recognition sensor 40 responds to the magnetic force of the rod 30 to determine the location of the current shift stage, converts the location into an electronic signal, and then transfers the state of the shift stage to the transmission via an actuator and the engine control unit (ECU).

After the state of the current shift stage is determined, a light showing the current shift stage illuminates the window of the shift stage display 80, and accordingly, the driver can recognize the state of the current shift stage at a glance.

Further, if a driver wants to operate the sports mode, he/she locates the shift stage operator 31 above the M-stage magnet 56 and changes the shift stage of the vehicle by moving the shift stage operator 31 to the +(positive)-stage magnet 55 or the −(negative)-stage magnet 57. At this time, the shift stage operator 31, that is located above the +(positive)-stage magnet 55 or the −(negative)-stage magnet 57, returns above the M-stage magnet 56 by the magnetic force of M-stage magnet 56.

According to the electronic shift lever of the present disclosure, injury to a driver when a vehicle collides can be prevented since the electronic shift lever does not protrude over a console of a vehicle, and further, excellent tactile sensation is provided when the shift lever is operated unlike the conventional electronic shift lever, which is composed of hard plastic material.

Since the electronic shift lever further includes an operation feeling portion and fixation pendulum, smooth operation feeling is achieved when the rod moves without a lifting of another part of the shift stage operator.

Additionally, the structure of the electronic shift lever is simple compared with the conventional electronic shift lever, thereby simplifying the assembly process, saving cost, and achieving easy and comfortable fingertip operation.

The size of the electronic shift lever is smaller than that of the conventional electronic shift lever, allowing enough space for a cup holder, etc. around the shift lever, and market competitiveness of the vehicle increases by the aesthetically improved interior design of the vehicle.

The disclosure has been described in detail with reference to preferred embodiments thereof. However, it will be appreciated by those skilled in the art that changes or modifications may be made in these embodiments without departing from the principles and spirit of the invention, the scope of which is defined in the appended claims and their equivalents.

What is claimed is:

1. An electronic shift lever comprising;
    a case through which a hollow is formed in a longitudinal direction;
    a shift lever cover that is formed to cover the hollow and is connected to lower sides of a front and a rear of the case by a case connector;
    a rod housing which is located adjacent a bottom of the case and in which a through-pipe is disposed in a longitudinal direction;
    a rod that is disposed in the through-pipe and slides frontward and rearward, said rod being spaced apart from a lower side of the shift lever cover;
    a recognition sensor disposed in a longitudinal direction at an inner lower side of the rod housing, said sensor sensing a location of the rod; and
    shift stage magnets arranged in a longitudinal direction spaced apart from the lower side of the shift lever cover, said shift stage magnets being able to stop the rod temporarily.

2. The electronic shift lever of claim 1, wherein a shift stage operator protruding upwardly to bend the shift lever cover is disposed at a remote end of the rod, and a rod magnet that responds to the recognition sensor is disposed at another remote end of the rod.

3. The electronic shift lever of claim 2, wherein the shift lever cover is made of a material selected from group consisting of fabric, cloth, wood, vinyl, leather, and aluminum, wherein the shift lever cover has elasticity and flexibility such that a part of the shift lever cover corresponding to the shift stage operator is curved upward as the shift stage operator moves and a remaining part of the shift lever cover is maintained in a flat shape.

4. The electronic shift lever of claim 1, wherein the rod housing further comprises a plurality of rod holes spaced apart from each other formed at a lower side of the through-pipe.

5. The electronic shift lever of claim 1, further comprising;
    an operation feeling portion that is located between the shift lever cover and the rod having the same size as the shift lever cover; and
    a plurality of fixation pendulums for connecting the shift lever cover and the operation feeling portion in the space between the shift lever cover and the operation feeling portion.

6. The electronic shift lever of claim 1, wherein the shift stage magnets are composed of:
    a P-stage magnet, an R-stage magnet, an N-stage magnet, a D-stage magnet, a +(positive)-stage magnet, an M-stage magnet, and a −(negative)-stage magnet 57 that are separated from each other wherein the P-stage magnet, the R-stage magnet, the N-stage magnet, and the D-stage magnet are separated from each other by an identical spaced distance;
    the spaced distance between the D-stage magnet and the +(positive)-stage magnet is longer than each of the spaces between of the P-stage magnet and the R-stage magnet, and the N-stage magnet and the D-stage magnet; and
    the +(positive)-stage magnet and the −(negative)-stage magnet are smaller in size than a size of the M-stage magnet, thereby having a magnetic force weaker than that of the M-stage magnet.

7. An electronic shift lever comprising;
    a case through which a hollow is formed in a longitudinal direction;
    a shift lever cover that is formed to cover the hollow and is connected to lower sides of a front and a rear of the case by a case connector;
    a rod housing which is located adjacent a bottom of the case and in which a through-pipe is disposed in a longitudinal direction;
    a rod that is disposed in the through-pipe and slides frontward and rearward, said rod being spaced apart from a lower side of the shift lever cover;
    a recognition sensor disposed in a longitudinal direction at an inner lower side of the rod housing, said sensor sensing a location of the rod;
    a shift stage magnet spaced apart from the lower side of the shift lever cover, said shift stage magnet being able to stop the rod temporarily; and a magnet cover formed in a longitudinal direction adjacent a top surface of the shift stage magnet, said magnet cover having a plurality of holes arranged in the longitudinal direction.

* * * * *